(12) United States Patent
Liao et al.

(10) Patent No.: US 7,988,893 B2
(45) Date of Patent: Aug. 2, 2011

(54) METHOD FOR FABRICATING CARBON NANOTUBE YARN

(75) Inventors: Yun-Hsin Kevin Liao, Santa-Clara, CA (US); Kai-Li Jiang, Beijing (CN); Shou-Shan Fan, Beijing (CN); Yuan Yao, Beijing (CN); Chang-Shen Chang, Taipei (TW); Hsien-Sheng Pei, Taipei (TW)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 364 days.

(21) Appl. No.: 12/284,084

(22) Filed: Sep. 18, 2008

(65) Prior Publication Data

US 2010/0065981 A1     Mar. 18, 2010

(51) Int. Cl.
*D02G 3/02* (2006.01)
(52) U.S. Cl. ........ 264/103; 156/292; 156/296; 264/165; 423/447.1
(58) Field of Classification Search .................. 264/103, 264/165; 156/292, 296; 423/447.1
See application file for complete search history.

(56) References Cited

U.S. PATENT DOCUMENTS

| 7,045,108 | B2 | 5/2006 | Jiang et al. |
| 7,704,480 | B2 * | 4/2010 | Jiang et al. ............. 423/447.1 X |
| 2007/0144780 | A1 * | 6/2007 | Jiang et al. .................. 174/94 R |
| 2007/0166223 | A1 * | 7/2007 | Jiang et al. .................. 423/447.1 |
| 2007/0237952 | A1 * | 10/2007 | Jiang et al. ................. 264/103 X |

FOREIGN PATENT DOCUMENTS

| CN | 100411979 | | 8/2008 |
| JP | 2007128892 A | * | 5/2007 |
| JP | 2007152540 A | * | 6/2007 |
| JP | 2007161563 A | * | 6/2007 |

* cited by examiner

*Primary Examiner* — Leo B Tentoni
(74) *Attorney, Agent, or Firm* — D. Austin Bonderer

(57) ABSTRACT

A method for fabricating a carbon nanotube yarn includes providing a plurality of carbon nanotube arrays; pulling out, by using a tool, a first carbon nanotube structure from one of the carbon nanotube arrays; pulling out a subsequent carbon nanotube structure from another one of the carbon nanotube arrays; joining a leading end of the subsequent carbon nanotube structure to a trailing portion of the carbon nanotube structure already formed by contacting the leading end of the subsequent carbon nanotube structure with the trailing portion of the already-formed carbon nanotube structure, with the contact occurring along a common lengthwise direction of the two carbon nanotube structures, thereby forming a lengthened carbon nanotube structure; repeating the pulling and the joining until the lengthened carbon nanotube structure has a desired length; and treating the lengthened carbon nanotube structure with an organic solvent.

20 Claims, 4 Drawing Sheets

US 7,988,893 B2

METHOD FOR FABRICATING CARBON NANOTUBE YARN

FIELD OF THE INVENTION

The present invention relates to methods for fabricating carbon nanotube material and, particularly, to a method for fabricating a carbon nanotube yarn.

DISCUSSION OF RELATED ART

Carbon nanotubes are tubules of carbon generally having a length of 5 to 100 micrometers and a diameter of 0.5 to 100 nanometers. Carbon nanotubes can be composed of a number of coaxial cylinders of graphite sheets, and have recently attracted a great deal of attention for use in different applications such as field emitters, gas storage and separation, chemical sensors, and high strength composites. Recently, carbon nanotube yarns have been fabricated. A carbon nanotube yarn includes a plurality of carbon nanotube bundles that are joined end to end by van der Waals attractive force. Each of the carbon nanotube bundles includes a plurality of carbon nanotubes substantially parallel to each other. The plurality of carbon nanotube bundles joined end to end by van der Waals attractive force form the continuous carbon nanotube yarn. After being treated with organic solvent, the carbon nanotube yarn can be readily used in cables, printed circuit boards, cloths, and other macroscopic applications.

For mass production, the carbon nanotube yarn should be relatively long. However, the length of the carbon nanotube yarn is limited by an area of a super-aligned carbon nanotube array from which the carbon nanotube yarn is derived. In general, a diagonal length of a rectangular super-aligned carbon nanotube array is only about 4 inches. Thus, the length of the carbon nanotube yarn is correspondingly limited.

What is needed, therefore, is to provide a method for fabricating a carbon nanotube yarn of any desired length.

SUMMARY

In one embodiment, a method for fabricating a carbon nanotube yarn includes: (a) providing a plurality of carbon nanotube arrays; (b) pulling out, by using a tool, a first carbon nanotube structure from one of the carbon nanotube arrays; (c) pulling out a subsequent carbon nanotube structure from another one of the carbon nanotube arrays; (d) joining a leading end of the subsequent carbon nanotube structure to a trailing portion of the carbon nanotube structure already formed by contacting the leading end of the subsequent carbon nanotube structure with the trailing portion of the already-formed carbon nanotube structure, with the contact occurring along a common lengthwise direction of the two carbon nanotube structures, thereby forming a lengthened carbon nanotube structure; (e) repeating (c) and (d) until the lengthened carbon nanotube structure has a desired length; and (f) treating the lengthened carbon nanotube structure with an organic solvent.

Other novel features and advantages of the present method for fabricating a carbon nanotube yarn will become more apparent from the following detailed description of exemplary embodiments when taken in conjunction with the accompanying drawings.

BRIEF DESCRIPTION OF THE DRAWINGS

Many aspects of the present method for fabricating a carbon nanotube yarn can be better understood with reference to the following drawings. The components in the drawings are not necessarily to scale, the emphasis instead being placed upon clearly illustrating the principles of the present method for fabricating a carbon nanotube yarn.

Figure 1:
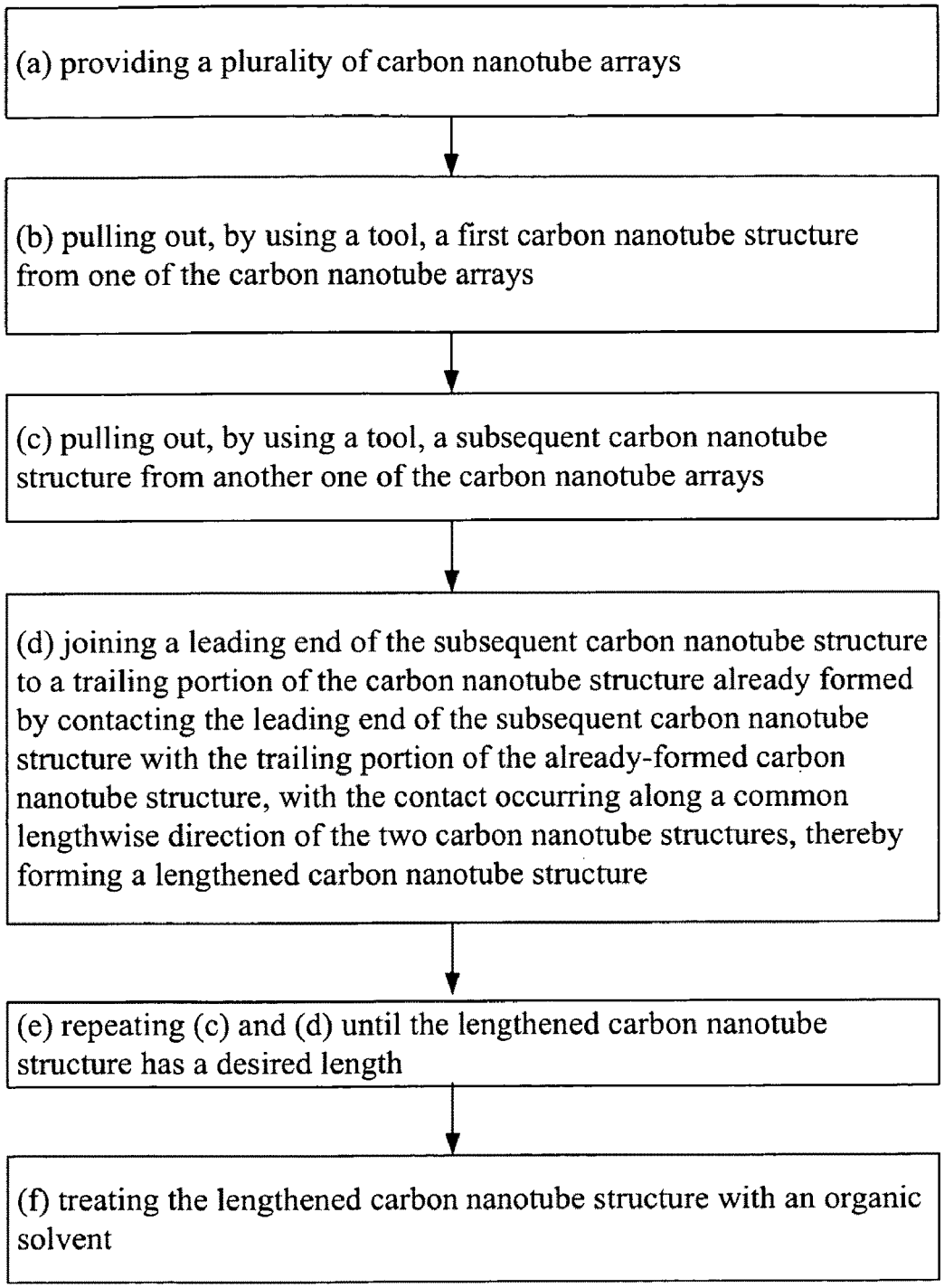
FIG. 1 is a flow chart of a method for fabricating a carbon nanotube yarn, in accordance with one embodiment of the present invention.

Corresponding reference characters indicate corresponding parts throughout the several views. The exemplifications set out herein illustrate at least one preferred embodiment of the present method for fabricating a carbon nanotube yarn, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present method for fabricating a carbon nanotube yarn.

Referring to FIG. 1, an exemplary method for fabricating a carbon nanotube yarn includes the steps of: (a) providing a plurality of carbon nanotube arrays, specifically, providing a plurality of super-aligned carbon nanotube arrays; (b) pulling out a first carbon nanotube structure from one carbon nanotube array, by using a tool (e.g., adhesive tape, pliers, tweezers, or another tool allowing multiple carbon nanotubes to be gripped and pulled simultaneously); (c) pulling out a subsequent carbon nanotube structure from another carbon nanotube array; (d) joining a leading end of the subsequent carbon nanotube structure to a trailing portion of the carbon nanotube structure already formed by contacting the leading end of the subsequent carbon nanotube structure with the trailing portion of the already-formed carbon nanotube structure, with the contact occurring along a common lengthwise direction of the two carbon nanotube structures, thereby forming a lengthened carbon nanotube structure; (e) repeating steps (c) and (d) a desired number of times until the lengthened carbon nanotube structure is of a desired length; and (f) treating the first carbon nanotube structure and all the subsequently joined carbon nanotube structures with an organic solvent to achieve a carbon nanotube yarn.

Figure 2:
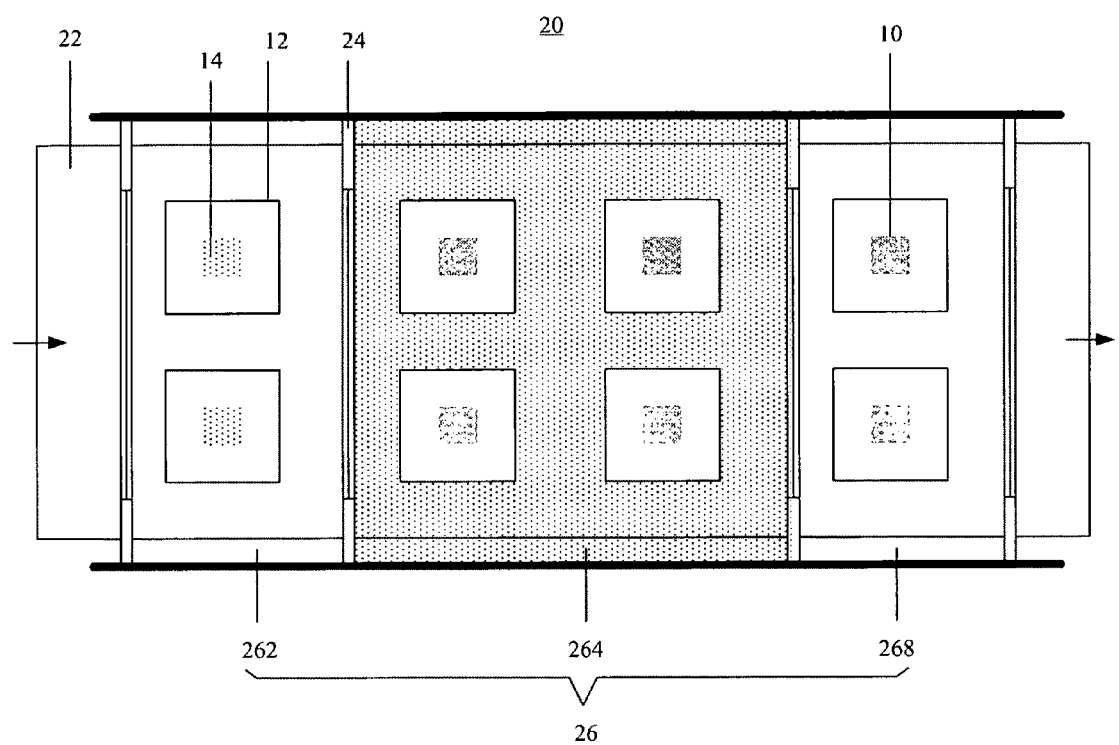
FIG. 2 is a top view of an exemplary reacting room used in the method of FIG. 1, showing associated equipment and material being processed.

Referring also to FIG. 2, in step (a), a plurality of super-aligned carbon nanotube arrays 10 are formed by the substeps of: (a1) providing a plurality of substantially flat and smooth substrates 12; (a2) forming catalyst layers 14 on the substrates 12; (a3) transferring the substrates 12 to a reacting room 20 by disposing the substrates 12 on a transferring device 22; and (a4) growing super-aligned carbon nanotube arrays 10 on the substrates 12 in the reacting room 20.

In step (a1), the substrates 12 can be P-type silicon wafers, N-type silicon wafers, or silicon wafers with a film of silicon dioxide thereon. In this embodiment, 4-inch P-type silicon wafers are used as the substrates 12.

In step (a2), the catalyst can be made of iron (Fe), cobalt (Co), nickel (Ni), or any alloy thereof. The catalyst layers 14 can be formed on the substrates 12 by any of various known methods (e.g., an electroplating method).

In step (a3), the substrates 12 are disposed in turn on the transferring device 22 to be delivered to the reacting room 20 at a controllable speed. Typically, the transferring device 22 is a conveyor.

The reacting room 20 includes several automatic doors 24. The automatic doors 24 divide the reacting room 20 into several reacting zones 26 having different temperatures. The temperature of each reacting zone 26 can be controlled by a computer. The different reacting zones 26 may be filled with a same gas or different gases. The transferring device 22 transfers the substrates 12 from one reacting zone 26 to another to grow carbon nanotube arrays 10 by a chemical vapor depositing (CVD) method. As such, the carbon nanotube arrays 10 can be formed continuously one after another.

In the present embodiment, the reacting room 20 includes a first reacting zone 262, a second reacting zone 264, and a third reacting zone 268. The first reacting zone 262 is filled with air, and the temperature thereof is in the approximate range from 700° C. to 900° C. The second reacting zone 264 is filled with a protective gas and a carbon source gas, and the temperature thereof is in the approximate range from 500° C. to 740° C.

The third reacting zone 268 is filled with a protective gas at room temperature. The protective gas in each of the second and third reacting zones 264, 268 can be made up of at least one of nitrogen ($N_2$), ammonia ($NH_3$), and a noble gas. The carbon source gas can be a hydrocarbon gas, such as ethylene ($C_2H_4$), methane ($CH_4$), acetylene ($C_2H_2$), ethane ($C_2H_6$), or any combination thereof.

In the reacting room 20, firstly, the catalyst layers 14 on the substrates 12 are annealed in the first reacting zone 262. Then, the substrates 12 are transferred to the second reacting zone 264 to grow the carbon nanotube arrays 10 thereon. Finally, the substrates 12 are transferred to the third reacting zone 268 and cooled down to room temperature.

Each of the super-aligned carbon nanotube arrays 10 can have a height of about 1 to 400 microns, and includes a plurality of carbon nanotubes parallel to each other and approximately perpendicular to the substrate 12. In the present embodiment, the height of the carbon nanotube array 10 is about 200 microns. The carbon nanotubes in the carbon nanotube array 10 can be multi-wall carbon nanotubes, double-wall carbon nanotubes, or single-wall carbon nanotubes. A diameter of the multi-wall carbon nanotubes is in the approximate range from 1.5 to 50 nanometers. A diameter of the double-wall carbon nanotubes is in the approximate range from 1 to 50 nanometers. A diameter of the single-wall carbon nanotubes is in the approximate range from 0.5 to 50 nanometers.

Each super-aligned carbon nanotube array 10 formed under the above conditions is essentially free of impurities such as carbonaceous or residual catalyst particles. The carbon nanotubes in the super-aligned carbon nanotube array 10 are closely packed together by van der Waals attractive force therebetween.

Figure 3:
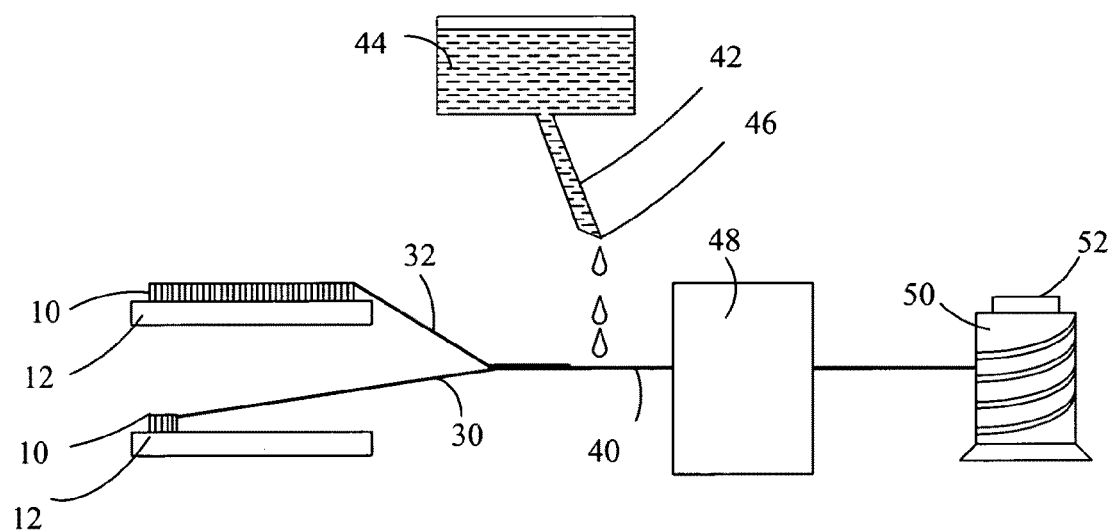
FIG. 3 is a schematic view of fabricating the carbon nanotube yarn according to the method of FIG. 1.

Referring also to FIG. 3, in step (b), the first carbon nanotube structure 30 can be formed by the substeps of: (b1) selecting one or more carbon nanotubes having a predetermined width from the super-aligned carbon nanotube array 10; and (b2) pulling the carbon nanotubes to form carbon nanotube segments at an even/uniform speed to achieve the carbon nanotube structure 30. Typically, the carbon nanotube structure 30 has an elongate, uniform configuration (see below).

In step (b1), each of the carbon nanotube segments includes a plurality of carbon nanotubes parallel to each other. The carbon nanotube segments can be selected by using an adhesive tape or tweezers as the tool to contact the super-aligned carbon nanotube array 10. In step (b2), the pulling direction is substantially perpendicular to the growing direction of the super-aligned carbon nanotube array 10.

More specifically, during the pulling process, as the initial carbon nanotube segments are drawn out, other carbon nanotube segments are also drawn out end to end due to van der Waals attractive force between ends of adjacent carbon nanotube segments. This process of drawing ensures that the continuous, uniform carbon nanotube structure 30 having a predetermined width can be formed. The carbon nanotube structure 30 includes a plurality of carbon nanotube segments. The carbon nanotube structure 30 includes a plurality of successive carbon nanotubes joined end to end by the van der Waals attractive force therebetween. The carbon nanotubes in the carbon nanotube structure 30 are all substantially parallel to the pulling/drawing direction of the carbon nanotube structure 30, and the carbon nanotube structure 30 produced in such manner can be selectively formed to have a predetermined width. The carbon nanotube structure 30 formed by the pulling/drawing method has superior uniformity of thickness and conductivity over a typical carbon nanotube structure with disordered carbon nanotubes therein (e.g., a disordered carbon nanotube film formed by spraying method or filtrating method). Further, the pulling/drawing method is simple, fast, and suitable for industrial applications.

Figure 4:
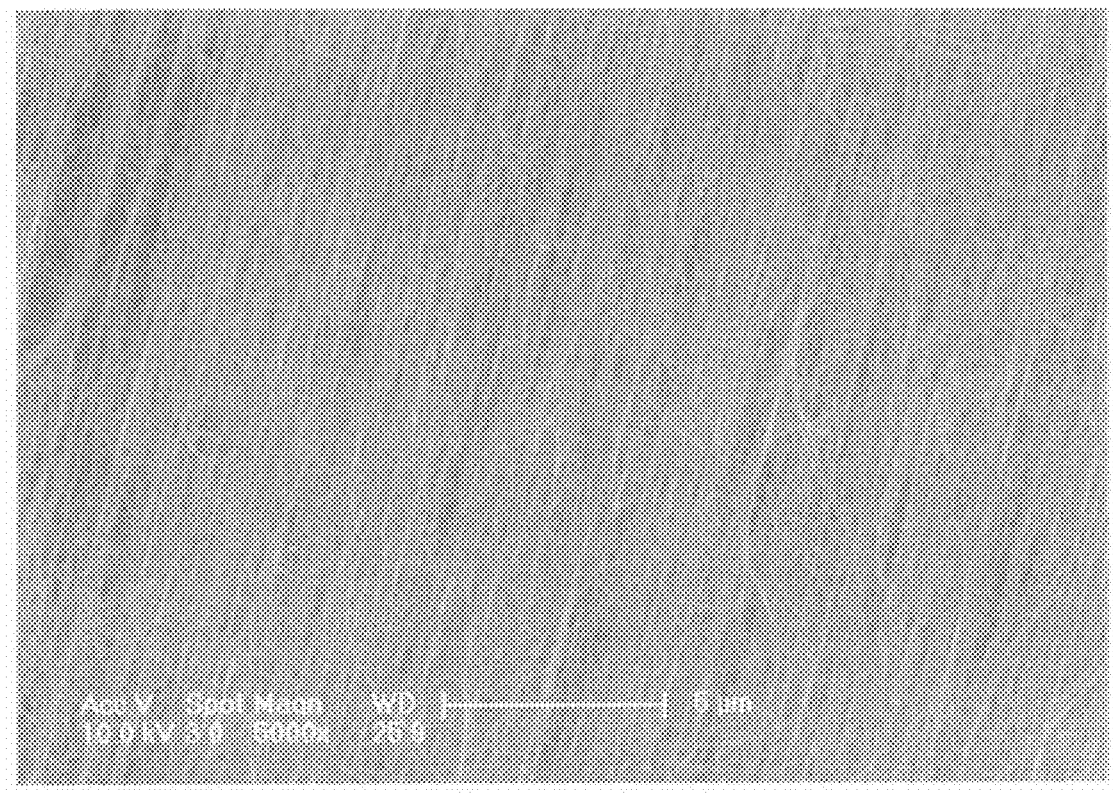
FIG. 4 shows a Scanning Electron Microscope (SEM) image of a carbon nanotube film used for fabricating the carbon nanotube yarn according to the method of FIG. 1.

It is to be understood that the carbon nanotube structure 30 can be a carbon nanotube film or a carbon nanotube wire. More specifically, in one embodiment, when the width of the carbon nanotube segments is relatively large, the obtained carbon nanotube structure 30 is a carbon nanotube film, as shown in FIG. 4. In another embodiment, when the width of the selected carbon nanotube segments is relatively small, the obtained carbon nanotube structure 30 is a carbon nanotube wire.

The width of the carbon nanotube structure 30 depends on a size of the carbon nanotube array and a width of the pulling tool. When the substrate 12 is a 4-inch type wafer as in the present embodiment, the width of the carbon nanotube structure 30 is in the approximate range from 0.5 nanometers to 10 centimeters, and the thickness of the carbon nanotube structure 30 is in the approximate range from 0.5 nanometers to 100 microns. The carbon nanotubes in the carbon nanotube structure 30 can include single-wall carbon nanotubes, double-wall carbon nanotubes, or multi-wall carbon nanotubes. Diameters of the single-wall carbon nanotubes, the double-wall carbon nanotubes, and the multi-wall carbon nanotubes can, respectively, be in the approximate range from 0.5 to 50 nanometers, 1 to 50 nanometers, and 1.5 to 50 nanometers.

In step (c), the subsequent carbon nanotube structure 32 is formed in the same manner as in step (b). A width of the carbon nanotube structure 32 can be the same as the width of the carbon nanotube structure 30.

In step (d), it is noted that because the carbon nanotubes in each super-aligned carbon nanotube array 10 have a high purity and a high specific surface area, the carbon nanotube structures 30, 32 are adhesive in nature. As such, when the leading end of the carbon nanotube structure 32 is brought into contact with the trailing portion of the carbon nanotube structure 30, the carbon nanotube structure 30 and the carbon nanotube structure 32 are joined together at the contacting area therebetween. Accordingly, by joining the carbon nanotube structure 30 and the carbon nanotube structure 32, the length of the carbon nanotube structure 30 can be increased to form a lengthened carbon nanotube structure (not labeled). In step (e), the length of the lengthened carbon nanotube structure is further extended.

In the present embodiment, in step (f), the entire length of the lengthened carbon nanotube structure is treated with the organic solvent 44 portion by portion, starting with the carbon nanotube structure 30. Detailedly, the entire surface of the carbon nanotube structure 30 can, beneficially, be soaked with the organic solvent 44. The organic solvent 44 can be dropped on the surface of the carbon nanotube structure 30 by a dropper 42. In the present embodiment, the dropper 42 is positioned ahead of the area where the carbon nanotube structure 32 is joined to the carbon nanotube structure 30. The dropper 42 includes an opening 46 in a bottom thereof. The organic solvent 44 can be dropped out from the opening 46 of the dropper 42, drop by drop. The organic solvent 44 is volatilizable, and can be selected from the group consisting of ethanol, methanol, acetone, dichloroethane, chloroform, and any combination thereof. In the present embodiment, the organic solvent 44 is ethanol. After being soaked by the organic solvent 44 portion by portion, the entire length of the lengthened carbon nanotube structure can be shrunk into the carbon nanotube yarn 40 portion by portion, starting with the carbon nanotube structure 30. Due to the decrease of the specific surface area of the entire carbon nanotube structure via bundling, the coefficient of friction of the carbon nanotube yarn 40 is reduced, while the high mechanical strength and toughness of the carbon nanotube yarn 40 is still maintained.

The carbon nanotube yarn 40 can be dried after being treated with the organic solvent 44. In the present embodiment, the carbon nanotube yarn 40 is passed through a drying device 48 portion by portion, starting with the portion corresponding to the carbon nanotube structure 30. The temperature of the drying device 48 can be in the approximate range from 80° C. to 100° C. In another embodiment, the carbon nanotube yarn 40 can be dried with a blow dryer. For example, the carbon nanotube yarn 40 is passed by the blow dryer portion by portion, starting with the portion corresponding to the carbon nanotube structure 30.

In one useful embodiment, an additional step (g) of collecting the carbon nanotube yarn 40 can be further provided after step (f). In the illustrated embodiment, the carbon nanotube yarn 40 is coiled onto a bobbin 50, with the bobbin 50 driven by a motor 52. In another embodiment, the carbon nanotube yarn 40 can be coiled onto the bobbin 50 by hand.

Referring to FIG. 3, it will be apparent to those having ordinary skill in the art that due to a high viscosity of the carbon nanotube structures 30, 32, during processing of the carbon nanotube yarn 40, the carbon nanotube structures 30, 32 are liable to stick to surrounding objects or debris. This can be dealt with by performing step (f) at the same time as steps (b) through (e) as a continuous, coordinated process flow.

More specifically, during the initial pulling step (b), as the carbon nanotube structure 30 is formed, a free leading end of the carbon nanotube structure 30 can be treated with the organic solvent 44 to begin forming the carbon nanotube yarn 40. The free leading end of the carbon nanotube yarn 40 can be passed through the drying device 48. Then the motor 52 drives the bobbin 50 to rotate, and the free leading end of the carbon nanotube yarn 40 is coiled onto the bobbin 50. The bobbin 50 continues to rotate and draw the carbon nanotube yarn 40 as it is progressively formed and output from the drying device 48. Meanwhile, the carbon nanotube structure 32 is attached onto the carbon nanotube structure 30 and the process of continuing to extend the lengthened carbon nanotube structure proceeds.

A diameter of the carbon nanotube yarn 40 can, suitably, be in the approximate range from 0.5 nanometers to 1 millimeter. The length of the carbon nanotube yarn 40 can be arbitrarily set for actual use. It can be understood that the carbon nanotube yarn 40 can be twisted, piled, stacked, or weaved by any known method in the art.

The carbon nanotube yarn 40 provided in the present embodiments has various advantages. Firstly, the carbon nanotube yarn 40 can be formed by a plurality of carbon nanotube structures joined end to end. As such, the length of the carbon nanotube yarn 40 can be arbitrarily set, and is not limited by the area of an individual carbon nanotube array 10. Secondly, the carbon nanotube yarn 40 has superior properties such as excellent toughness, high mechanical strength, good thermal and electrical conductivity, and ample length. Thus, the carbon nanotube yarn 40 can be readily used in cables, printed circuit boards, cloths, and other macroscopic applications.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for fabricating a carbon nanotube yarn, the method comprising:
    (a) providing a plurality of carbon nanotube arrays;
    (b) pulling out a first carbon nanotube structure from one of the plurality of carbon nanotube arrays;
    (c) pulling out a subsequent carbon nanotube structure from another one of the plurality of carbon nanotube arrays;
    (d) joining a leading end of the subsequent carbon nanotube structure to a trailing portion of the first carbon nanotube structure by contacting the leading end of the subsequent carbon nanotube structure with the trailing portion of the first carbon nanotube structure, thereby forming a lengthened carbon nanotube structure; and
    (f) treating the lengthened carbon nanotube structure with an organic solvent.

2. The method of claim 1, wherein (f) is performed substantially simultaneously with (b) through (d).

3. The method of claim 2, wherein the entire lengthened carbon nanotube structure is treated with the organic solvent.

4. The method of claim 1, wherein each carbon nanotube structure comprises a plurality of successive carbon nanotubes joined end to end by van der Waals attractive force therebetween, and the carbon nanotubes are substantially oriented along a same direction and parallel to a surface of the carbon nanotube structure.

5. The method of claim 1, wherein a diameter of the carbon nanotube yarn is in the approximate range from 0.5 nanometers to 1 millimeter.

6. The method of claim 1, wherein (b) comprises:
    (b1) selecting one or more carbon nanotubes having a predetermined width from the super-aligned carbon nanotube array; and
    (b2) pulling the selected carbon nanotubes to achieve a uniform carbon nanotube structure.

7. The method of claim 1, wherein the organic solvent is selected from the group consisting of ethanol, methanol, acetone, dichloroethane, chloroform, and combinations thereof.

8. The method of claim 1, further comprising drying the lengthened carbon nanotube structure to remove the organic solvent from the lengthened carbon nanotube structure.

9. The method of claim 8, wherein drying the lengthened carbon nanotube structure is performed by using at least one of a drying device and a blower.

10. The method of claim 8, wherein the drying is performed substantially simultaneously with (b) through (f) as a continuous, coordinated process flow, with the lengthened carbon nanotube structure being dried portion by portion.

11. The method of claim 1, further comprising collecting the lengthened carbon nanotube structure.

12. The method of claim 11, wherein the carbon nanotube yarn is coiled around a bobbin by means of at least one of a motor and by hand.

13. The method of claim 11, wherein the collecting is performed substantially simultaneously with (b) through (f) as a continuous, coordinated process flow, with the lengthened carbon nanotube structure being collected portion by portion.

14. A method for fabricating a carbon nanotube yarn, the method comprising:
   (a) pulling out a preceding carbon nanotube structure from a first carbon nanotube array, and pulling out a subsequent carbon nanotube structure from a second carbon nanotube array, each carbon nanotube structure comprising a plurality of carbon nanotubes, the carbon nanotubes in each carbon nanotube structure being aligned substantially along a same direction and substantially parallel to a surface of the carbon nanotube structure;
   (b) joining the successive carbon nanotube structure with the preceding carbon nanotube structure to form a lengthened carbon nanotube structure, the lengthened carbon nanotube film having a greater length than a maximum length of a carbon nanotube film drawn from only one carbon nanotube array, the alignment direction of the carbon nanotubes in the successive carbon nanotube structure being substantially the same as the alignment direction of the carbon nanotubes in the preceding carbon nanotube structure; and
   (c) treating the lengthened carbon nanotube structure with an organic solvent.

15. The method of claim 14, wherein each of the carbon nanotube structures is at least one of a carbon nanotube film and a carbon nanotube wire.

16. The method of claim 14, wherein each of the carbon nanotube structures is adhesive in nature.

17. The method of claim 14, wherein (b) further comprises contacting an end of the successive carbon nanotube structure with an end portion of the preceding carbon nanotube structure while the successive carbon nanotube structure is still in the process of being formed.

18. A method for fabricating a carbon nanotube structure, the method comprising:
   (a) providing a first carbon nanotube array and a second carbon nanotube array;
   (b) pulling out a preceding carbon nanotube film from the first carbon nanotube array, the preceding carbon nanotube film having a first leading end and a first trailing portion;
   (c) pulling out a subsequent carbon nanotube film from the second the carbon nanotube array, the subsequent carbon nanotube film having a second leading end and a second trailing portion;
   (d) joining the second leading end to the first trailing portion by contacting the second leading end with the first trailing portion.

19. The method of claim 18, wherein the second leading end to the first trailing portion are joined end to end by van der Waals attractive force therebetween, each of the carbon nanotube films comprises a plurality of carbon nanotubes joined by van der Waals attractive force therebetween and oriented along a same direction and parallel to a surface of the film.

20. The method of claim 18, wherein (d) is further comprises the subsequent carbon nanotube film being connected to the second carbon nanotube array.

* * * * *